(12) United States Patent
Epiktetov

(10) Patent No.: US 9,380,162 B2
(45) Date of Patent: Jun. 28, 2016

(54) GRAPHICAL USER INTERFACE AND METHOD FOR TESTING AND VISUALLY REPRESENTING TELEPHONY STATE

(71) Applicant: GENESYS TELECOMMUNICATIONS LABORATORIES, INC., Daly City, CA (US)

(72) Inventor: Mikhail G. Epiktetov, San Mateo, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 13/887,227

(22) Filed: May 3, 2013

(65) Prior Publication Data
US 2014/0328479 A1 Nov. 6, 2014

(51) Int. Cl.
| | |
|---|---|
| H04M 3/00 | (2006.01) |
| H04M 3/51 | (2006.01) |
| H04M 3/24 | (2006.01) |
| H04L 12/66 | (2006.01) |
| H04N 17/00 | (2006.01) |
| H04M 3/22 | (2006.01) |
| H04M 3/12 | (2006.01) |

(52) U.S. Cl.
CPC ............ *H04M 3/5183* (2013.01); *H04M 3/241* (2013.01)

(58) Field of Classification Search
CPC ... H04L 65/403; H04L 51/36; H04L 65/1006; H04L 67/22; H04L 51/043; H04L 65/1053; H04L 67/24; H04L 29/06176; H04L 45/24; H04L 51/16; H04L 63/0263; H04L 63/1408; H04L 65/105; H04L 67/02; H04M 3/5183; H04M 1/2535; H04M 3/5175; H04M 3/5191
USPC ................. 715/736, 737, 771, 853, 854, 855; 370/352, 353, 354, 355, 356, 357; 379/265, 266
See application file for complete search history.

(56) References Cited

U.S. PATENT DOCUMENTS

| | | | | |
|---|---|---|---|---|
| 5,754,636 | A | * | 5/1998 | Bayless et al. ............. 379/142.1 |
| 6,100,891 | A | * | 8/2000 | Thorne ......................... 715/854 |

(Continued)

OTHER PUBLICATIONS

Microsoft, Lync 2010 Quick Start Manual, Sep. 13, 2010, accessed Dec. 4, 2014, www.microsoft.com/en-us/download/details.aspx?id=7091.*
Sue Pejic, Swinburne University of Technology, Microsoft Lync 2010 the Essentials Training User Guide, Aug. 29, 2011, accessed Dec. 4, 2014, www.its.swinburne.edu.au/_assets/files/outlook/Microsoft%20Lync%202010%20The%20Essentials/2.pdf.*

(Continued)

*Primary Examiner* — Ahmad F Matar
*Assistant Examiner* — Kharye Pope
(74) *Attorney, Agent, or Firm* — Lewis Roca Rothgerber Christie LLP

(57) ABSTRACT

In one implementation an apparatus is provided, comprising a processor and a memory, the memory storing instructions that when executed by the processor cause the processor to access a pre-designed graphical user interface (GUI) framework, load into the GUI, first party and third party call controls, load into the GUI, representations of telephony objects, load into the GUI, at least one interactive link to one or more scripting tools, load into the GUI, a interactive user control panel, load into the GUI, a digital tone detector, display the GUI on a computing appliance monitor, and display current call state for one or more call connection types.

16 Claims, 11 Drawing Sheets

(56) References Cited

U.S. PATENT DOCUMENTS

| | | | |
|---|---|---|---|
| 6,882,724 B2* | 4/2005 | Hartmeier | 379/265.03 |
| 8,582,475 B1* | 11/2013 | Marghescu et al. | 370/270 |
| 2002/0175929 A1* | 11/2002 | Hunt et al. | 345/704 |
| 2005/0174990 A1* | 8/2005 | Riemann et al. | 370/352 |
| 2005/0278630 A1* | 12/2005 | Bracey | 715/704 |
| 2007/0174776 A1* | 7/2007 | Ghattu | 715/733 |
| 2007/0201678 A1* | 8/2007 | Marquette et al. | 379/265.01 |
| 2010/0246800 A1* | 9/2010 | Geppert et al. | 379/265.09 |
| 2012/0128134 A1* | 5/2012 | Pappas et al. | 379/1.01 |

OTHER PUBLICATIONS

Louisiana State University, Microsoft Lync How-to Guide, accessed Dec. 4, 2014, www.grok.lsu.edu/categories.aspx?parentcategoryid=2540.*

Microsoft Lync 2010 Press Release, Microsoft News Center, Richmond, Washington, Sep. 13, 2010.*

Tech Info-SS7 Protocols, 8 pages, http://www.zytrax.com/tech/ss7/ss7_intro.html.

* cited by examiner

GRAPHICAL USER INTERFACE AND METHOD FOR TESTING AND VISUALLY REPRESENTING TELEPHONY STATE

BACKGROUND

1. Field

The present invention is in the field of telecommunications and pertains particularly to methods and apparatus for testing and controlling telephony state in a contact center.

2. Discussion of the State of the Art

Contact centers are utilized by corporations and other businesses to interact with customers of contracting entities to fulfill their needs relative to customer service, transacting, and client development. A typical contact center conducts business with customers through myriad different channels of interaction. State-of-art contact centers may support incoming and outgoing voice interactions using session initiated protocol (SIP) in addition to the more traditional computer telephony integration (CTI) voice calls.

A contact center is charged generally with testing telephony connections and infrastructure and maintaining active state of all interaction and reporting state according to certain service level agreements (SLAs) the center might have in place with various parties to a contract. In a contact center that supports both traditional CTI telephony and SIP telephony concurrently, the tools for testing SIP and CTI functionality including connection state and integrity are separately implemented in many cases and do not provide functionality or results in one interface, adding to the complexity of testing and maintaining telephony function in the center.

More particularly, SIP oriented testing tools typically lack CTI integration requiring complicated scripting in order to accomplish such integration. Furthermore, CTI-oriented test tools work generally only in the control path and cannot provide first party call control or voice path verification. As a result, fully automated tests of complex telephony scenarios are not practically possible with traditional tools.

Therefore, what is clearly needed is a graphical user interface application that combines first and third party call control functionality, graphical representation of telephony objects, signal path testing functionality, and integration with scripting tools.

SUMMARY

In one implementation an apparatus is provided, comprising a processor and a memory, the memory storing instructions that when executed by the processor cause the processor to access a pre-designed graphical user interface (GUI) framework, load into the GUI, SIP endpoint simulation, load into the GUI, first party and third party call controls, load into the GUI, representations of telephony objects, load into the GUI, at least one interactive link to one or more scripting tools, load into the GUI, an interactive user control panel, load into the GUI, a digital tone detector, display the GUI on a computing appliance monitor, and display current call state for one or more call connection types.

In one implementation, the apparatus is implemented in a contact center environment. In one implementation, the first party call controls are associated with session initiation protocol (SIP) endpoints and SIP communication. In one implementation, the third party call controls are associated with a computer telephony integration (CTI) telephony server. In one implementation, the telephony objects include one or more of a switch, a router, a hub, a gateway, a server, an auto-attendant, and a communication end-point.

In one implementation, the display for current call state is a telephony-state tree having two separate active state views. In one implementation, one active state view depicts a device view of active calls where calling parties are identifiable as sub-elements to directory numbers (DNs). In one implementation, one active state view depicts a call view of active calls where calling parties are depicted as sub-elements of calls and call threads. In one implementation, the telephony object representations are interactive icons.

In one implementation, the interactive user control panel includes testing controls for manual and for automated testing of active telephony state. In one implementation, the interactive user control panel further includes tools for reconfiguring telephony objects. In one implementation, the interactive user control panel includes first party call controls.

In one implementation, a method is provided comprising acts of accessing a pre-designed graphical user interface (GUI) framework, loading into the GUI, first party and third party call controls, loading into the GUI, representations of telephony objects, loading into the GUI, at least one interactive link to one or more scripting tools, loading into the GUI, a interactive user control panel, loading into the GUI, a digital tone detector, displaying the GUI on a computing appliance monitor, and displaying current call state for one or more call connection types.

In one implementation of the method, one or more simulated directory numbers are configured with an audible tone and unique name. In one implementation of the method, an incoming telephony stream is analyzed for established voice paths between telephony endpoints. In one implementation of the method, the audible tones and associated names assigned to the configured directory numbers that are currently party to voice are received using the digital tone detector. In one implementation of the method, the names associated with those directory numbers are displayed in a visual manner.

In one implementation, a method is provided comprising acts of configuring one or more simulated directory numbers with an audible tone and unique name, analyzing an incoming telephony stream for established voice paths between telephony endpoints, using a digital tone detector, receiving the audible tones and associated names assigned to the configured directory numbers that are currently party to voice, and displaying the names associated with those directory numbers in a visual manner. In one implementation of the method, the names are visible in a telephony state tree having a device view and a call view.

BRIEF DESCRIPTION OF THE DRAWING FIGURES

DETAILED DESCRIPTION

Embodiments of the present invention are directed to an apparatus and method for testing a telephony network combining first party and third party call controls. The present invention is described in enabling detail using the following examples, which may describe more than one relevant implementation falling within the scope of the present invention.

Figure 1:
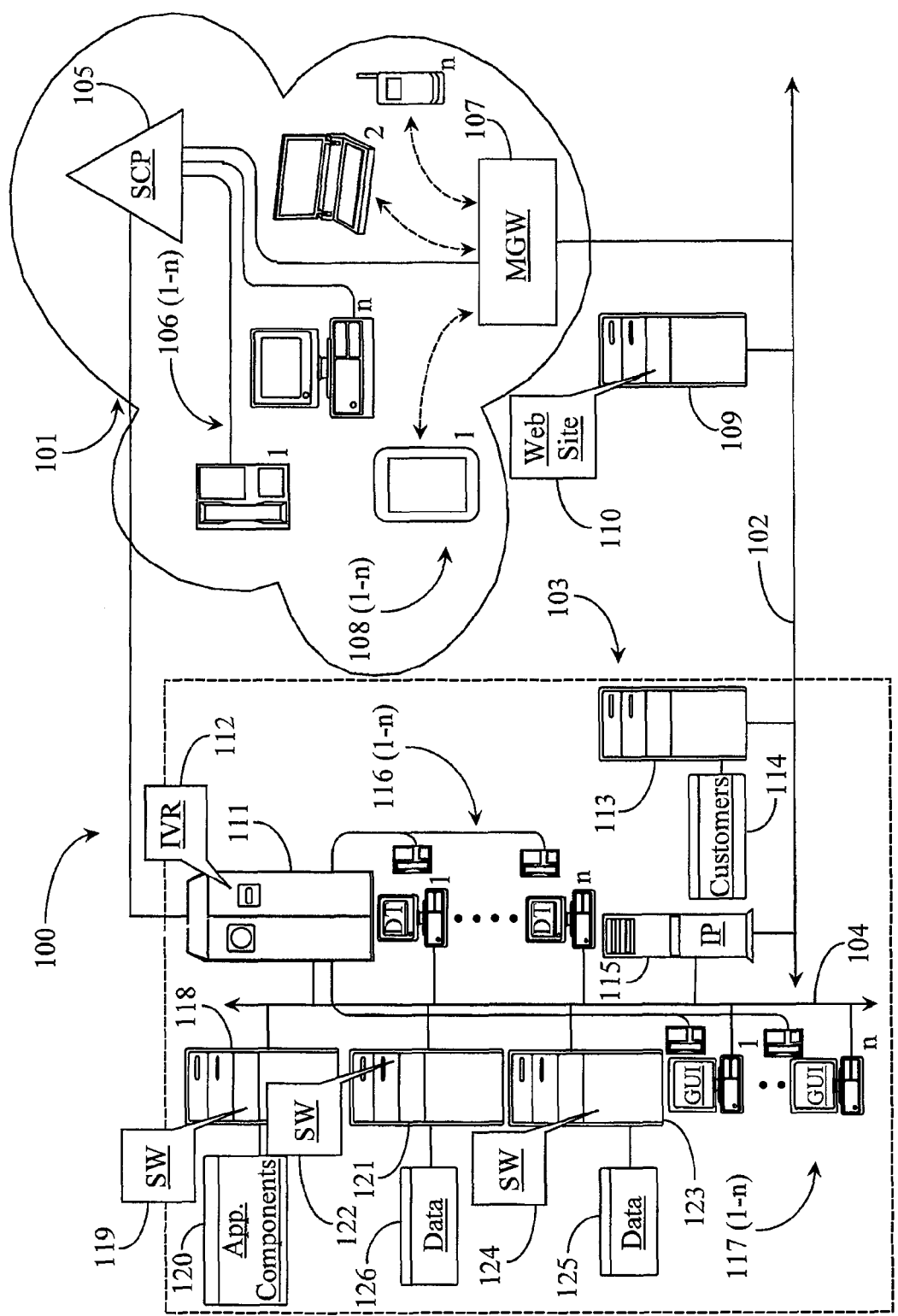
FIG. 1 is an architectural diagram of a communications network supporting voice path testing according to an implementation of the present invention.

FIG. 1 is an architectural diagram of a communications network 100 supporting voice path testing according to an implementation of the present invention. Network 100 may be a service network such as a contact center service network. Network 100 may include one or more service domains such as a contact center 103 bounded by a broken rectangle. Network 100 may include an Internet network segment depicted herein as network backbone 102. Backbone 102 may represent all of the lines, equipment, and access points of the Internet network as a whole, including connected sub-networks. Therefore, there may be no geographic limitations to the practice of the present invention.

Contact center domain 103 may include a local area network (LAN) depicted herein as LAN backbone 104. LAN 104 may support contact center equipment including switches, routers servers, computers, and automated services such as interactive voice response. Contact center 103 may have a Web site 110 depicted herein as running on a Web server 109 connected to backbone 102 outside of the physical domain of the contact center. Website 110 may be presented as an access point for network-connected clients to access services available through contact center 103. Web site 110 may include access points to various contact center services such as sales, technical service, contact center blogs, product descriptions, service descriptions and problem resolution services, among others. Web server 109 providing Website 110 may be deployed, connected to backbone 102, to serve web content to customers, independently of voice connectivity.

Network 100 may include a carrier network 101, which broadly represents any connected sub-network through which a customer might access the call center. Network 101 may be a public switched telephone network (PSTN) or a wireless carrier network. Both wireless and wired communication may be represented in this example. Customers 106 (1-n) and customers 108 (1-n) may access contact center services from network 101 through service control point 105 or media gateway 107. Customers 106 (1-n) represent customers connecting to contact center services by wire. Customers 108 (1-n) represent customers connecting to contact center services by a wireless protocol.

The media gateway 107 has connection to backbone 102 and may provide conversion between traditional and Voice over IP (VoIP) telephony. Contact center 103 may support voice-over-IP telephony, such as, for example, session initiation protocol (SIP) telephony, as well as more traditional computer telephony integration (CTI) telephony. Contact center 103 may include an Internet protocol (IP) router 115 for routing data from Internet 102 onto LAN 104 to various service destinations.

In this implementation, contact center 103 includes a SIP server 121. SIP server 121 may include at least one processor, at least one data repository, and a non-transitory physical medium supporting running software 122 adapted to enable SIP communication between SIP-enabled agent communications appliances and SIP-enabled clients that might be used to contact the center. It is noted herein that each server representation in this example may be assumed to have access to at least one processor, at least one data repository, and a non-transitory physical medium supporting running software instances, which are described in more detail later in this specification. SIP server 121 has connection to a data repository 126 adapted to contain data as may be required to function as a SIP server. SIP server 121 includes SIP-lib as a sub-component implementing SIP protocol.

Service control point 105 has connection to a telephony switch 111 within the domain of center 103. Switch 111 may be adapted to interact with customers using interactive voice response (IVR) services depicted herein as IVR 112. Callers accessing services by telephone such as customer 106 (1) may be connected to switch 111 and IVR 112 to determine caller identification and intent (reason for calling) so correct routing may be provided if required. Service control point 105 also has a logical connection to the media gateway 107, in this example, to facilitate VoIP functionality for both wired and wireless callers 106, 107 and 108. The media gateway 107 may be adapted to receive both traditional telephony calls and VoIP calls.

Switch 111 may, in one implementation, be adapted as a soft switch able to receive both telephony calls and IP calls. Switch 111 has connection to LAN 104 inside the call center. Contact center 103 may include a number of agent stations 116 (1-n) representing call center agents whom may be active and ready to take calls. Each agent station 116 (1-n) may include a desktop computing appliance connected to LAN 104 within the call center domain. Each agent station may include a standard telephone, which may be SIP enabled and connected to switch 111 by telephone wire. LAN 104 may support a number of supervisor stations, depicted herein as supervisor stations 117 (1-n). Supervisor stations 117 (1-n) may each include a LAN-connected computer and a SIP-enabled telephone connected to switch 111.

Contact center 103 may include a customer information server 113. Customer information server 113 has connection, in this implementation to a data repository 114 containing information about customers serviced by contact center 103. A universal routing server (not illustrated) may be supported by LAN 104 and may provide routing strategies for routing calls and messages to agents and automated services, including routing of SIP calls and messages. Contact center 103 may include a telephony server (T-server) 123. T-server 123 has connection to LAN 104 and may provide telephony services for CTI telephony connections. T-server 123 hosts SW 124 running from the non-transitory medium of the processor of the server. SW 124 includes all of the instruction and functionality for server 123 to function as a CTI telephony server.

T-server 123 has connection to a data repository 125 containing data required to function as a T-server. T-server 123 includes T-lib as a sub-component implementing CTI-protocol. Various servers depicted in this implementation may have access to a data repository (not illustrated) containing business rules relative to routing and other procedures and services that might be offered in by contact center 103. Contact center 103 may include an application server 118. Application server 118 has connection to LAN 104 in this implementation and host contact center applications for routing, IVR, and testing and maintaining components and systems within the contact center. Application server 118 has connection in this implementation to a data repository 120 containing application components for one or many different contact center applications including an application for testing telephony network connections and call control functions within the contact center.

According to at least one implementation, a telephony network testing application is provided that may be leveraged by contact center personnel to test telephony functionality including verifying SIP voice paths and integration of first and third party call controls. The testing application may be represented by software 119 executing from memory on the processor of application server 118. Supervising agents like supervisors 117 (1-n) may access application 119 and may be served a graphical user interface (GUI) as depicted running on their respective computing monitors. Agents working at stations 116 (1-n) may have desktop (DT) applications for staging and managing agent tasks including communication, message processing, workforce scheduling, and so on. Such applications may include interfacing components for communicating with SIP server 121 and T-server 123.

In use of the present invention, SW 119 may enable a contact center administrator or supervising agent to perform various tests with manual and automation support to validate network telephony connectivity and other SIP and CTI telephony feature functions through a single interface. The application may also provide a combination of first and third party call controls for managing connectivity and facilitating calling features in a mixed telephony environment. Additionally, SW 119 may provide a pre-designed, personalized GUI framework that when loaded and served may enable pre-configuration of both SIP virtual endpoints and CTI destination devices.

Loaded GUI components may include representations of telephony objects including but not necessarily limited to switches, routers, hubs, gateways, telephony servers, auto attendants like interactive voice response (IVR) units, and communication endpoint devices. In one implementation, the telephony objects are interactive providing access to configuration and state monitoring to the user. GUI components may also include, at least one interactive link to one or more scripting tools, one or more of which may be a telnet-based scripting tool, an interactive user control panel serving as a testing interface, a digital tone detector for aiding in voice path verification between SIP endpoints. Application server 118 may serve the GUI upon request and the GUI may be displayed on a computing appliance monitor of the requestor. Among other features, the GUI may display current call state for one or more call connection types including a mixed view of traditional CTI and SIP connections.

Figure 2:
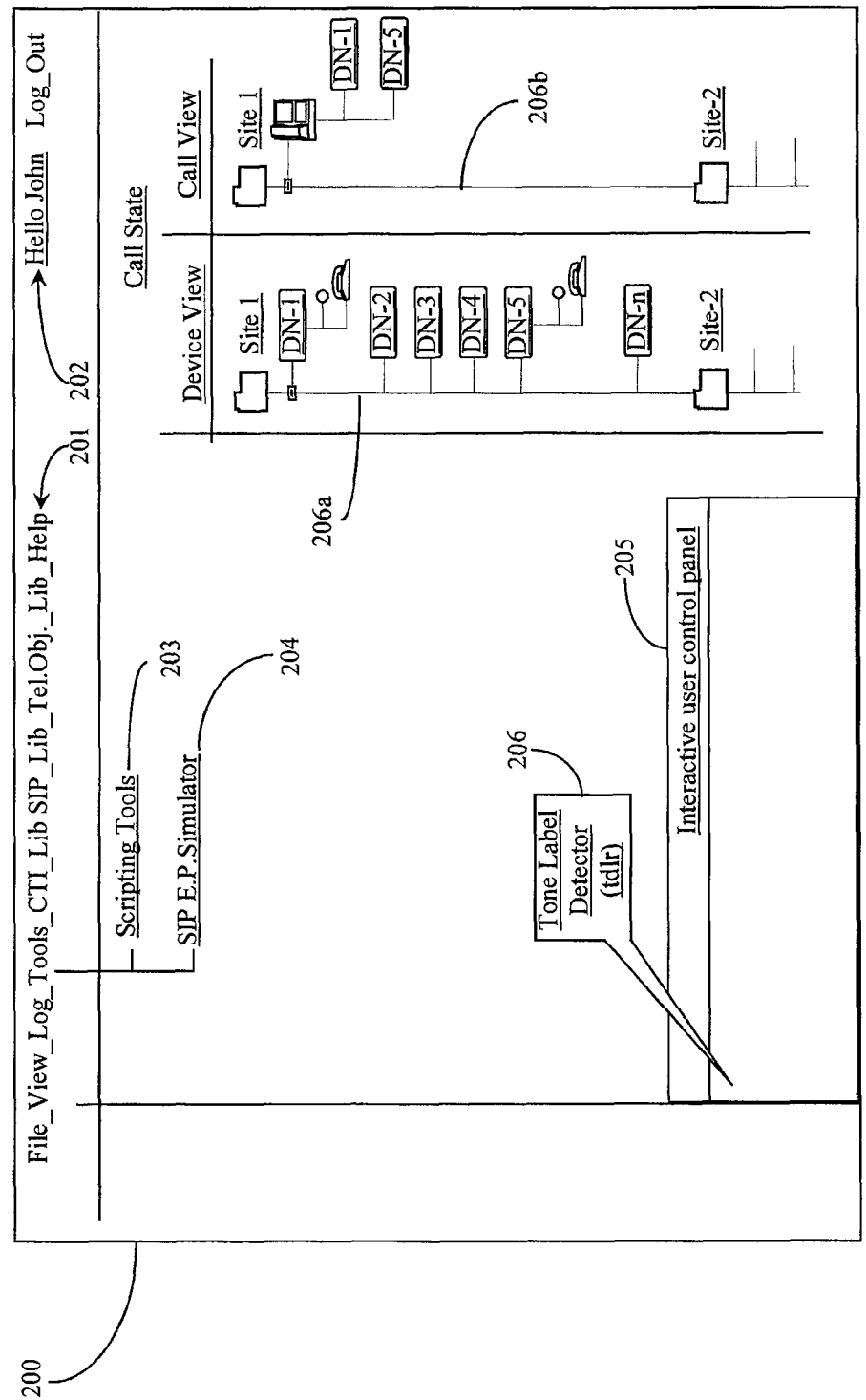
FIG. 2 is a frontal view of a graphics user interface (GUI) for telephony network testing and troubleshooting according to an implementation of the present invention.

FIG. 2 is an illustration of an interactive graphics user interface (GUI) 200 for telephony network testing and troubleshooting according to an implementation of the present invention. GUI 200 may be served upon request to authorized persons from an application server such as server 118 hosting SW 119. An authorized person may be an agent supervisor or a contact center administrator authorized to access the GUI for the purpose of monitoring and testing in a mixed telephony network environment such as in the domain of contact center 103 where both SIP voice telephony and traditional CTI telephony are supported.

GUI 200 may be customized and personalized to individual requestors and may require login and other authentication procedures to gain full access to the GUI and associated tools. In this implementation personalized messaging 202 includes the message "hello John," and a Log-out option assuming that John is logged into the GUI with proper authentication. GUI 200 may include one or more pull-down type menus 201, which may include a file menu, a view menu, a log menu, a tools menu, a CTI library (Lib) menu (access to CTI third party controls and features), a SIP library (Lib) menu (access to SIP first party controls and features), a telephony object library (Tel. Obj. Lib) menu and a help menu. Further expansion of menus 201 (Tools) may reveal an access link to one or more scripting tools, one or more of which may be telnet-based, and access to a SIP endpoint simulation engine for simulation of SIP enabled communications endpoints. SIP endpoints may include any brand of SIP phones, gateways, and soft switches.

GUI 200 may include an interactive user control panel (UCP) 205 serving in one implementation as a testing interface for testing telephony connections and existing telephony states. In one implementation, interactive user control panel 205 may include a tone label detector (tdlr) 206. Tone label detector 206 may be used in one implementation to detect one or more tonal frequencies that might be pre-associated with simulated SIP endpoints along with unique pre-assigned nomenclature for those SIP endpoints. In one implementation, tone label detector 206 may be controlled using a telnet™-based scripting tool accessible from the file menu. However, this is not required to practice the present invention. The tone label detector may be controlled from within the GUI. In testing for voice path verification in a SIP stream, the application may receive the pre-assigned tone when testing (pinging) those end points for voice path verification. Interactive user control panel 205 may enable the user to input set commands for testing the functions of first party call control (1pcc) telephony operations. Interactive user control panel 205 may enable a user to access SIP call history, verify established voice paths, verify SIP signaling, and modify SIP endpoint configuration on the fly including creating of custom SIP headers for the purpose of testing different call flow scenarios.

In one implementation, GUI 200 may include a user-friendly visual presentation of call state in a dual panel or two-panel state tree that may include graphical icons representing directory numbers and call control states. In one implementation, GUI 200 may be used to assemble a mixed SIP and CTI directory number group that includes both SIP endpoint destinations and more traditional CTI destinations and that may be visually represented within the GUI according to one or more assembled state views or trees. In one implementation the call state section displayed in GUI 200 may include a state tree 206a representing a "device view" and a state tree 206b representing a "call view". These views of call state information may be viewed concurrently or separately within GUI 200. Each state tree 206a and 206b might be rendered navigable such as for exploration and discovery by expanding certain basic or higher level components depicted in the state tree to reveal associated sub-elements.

In use of the present invention, an authorized user operating GUI 200 may pre-configure one or more simulated SIP directory numbers or endpoints with an audible tone or tonal frequency and a unique name. With the aid of the GUI 200 and interactive user control panel 205, the incoming data stream may be analyzed for established voice paths between telephony endpoints. State tree device view 206a may depict a grouping of directory numbers representing a group of agents associated with site 1 (Site 1), which might be represented by an expandable folder icon. A user expanding the folder icon may see the pre-configured directory numbers (DNs) arranged in order such as DN-1 through DN-n representing the communication endpoints for that site.

In the expanded "device" view of site 1, the call parties and associated device icons and call state indicia may be represented as sub-elements of the associated directory numbers. In this implementation, the DN icons may be expanded to visually access the current communication states of the designated call parties or participants according to a mix of first party and third party call controls. In site 1, DN-1 and DN-5 are expanded to reveal the current call states at those directory numbers (detailed call state not illustrated here). DN-1 and DN-5 may be party to one call in progress.

State tree call view 206b may depict the same groupings of communication endpoints representing the group of agents associated with call site 1 (Site 1), which might also be represented by an expandable folder icon. A user expanding the folder icon may see the pre-configured directory numbers (DNs) appearing as sub-elements of represented calls or call threads. In the expanded "call" view, a telephone icon represents a call in progress between DN-1 and DN-5. Call state views 206a and 206b may be scrolled using traditional computing input to reveal more than one site, each site representing a different grouping of agents or any other participants whose call states may be monitored, or whose call connections are simulated for testing.

It is noted herein that the call state as visualized in GUI 200 may be the result of actual state monitoring of a live real-time telephony environment in one implementation or the result of testing of an assembled virtual telephony environment wherein the simulated endpoints are tested for capability and call state integrity offline or before live communication begins for the represented agent grouping. Therefore, there may be a visual indication associated with one or more views of call state that reveals whether the view is depicting live results or results of testing in a virtual telephony environment. A SIP endpoint device such as a SIP phone may be configured as a T-server client only or as a SIP server client.

Figure 3:
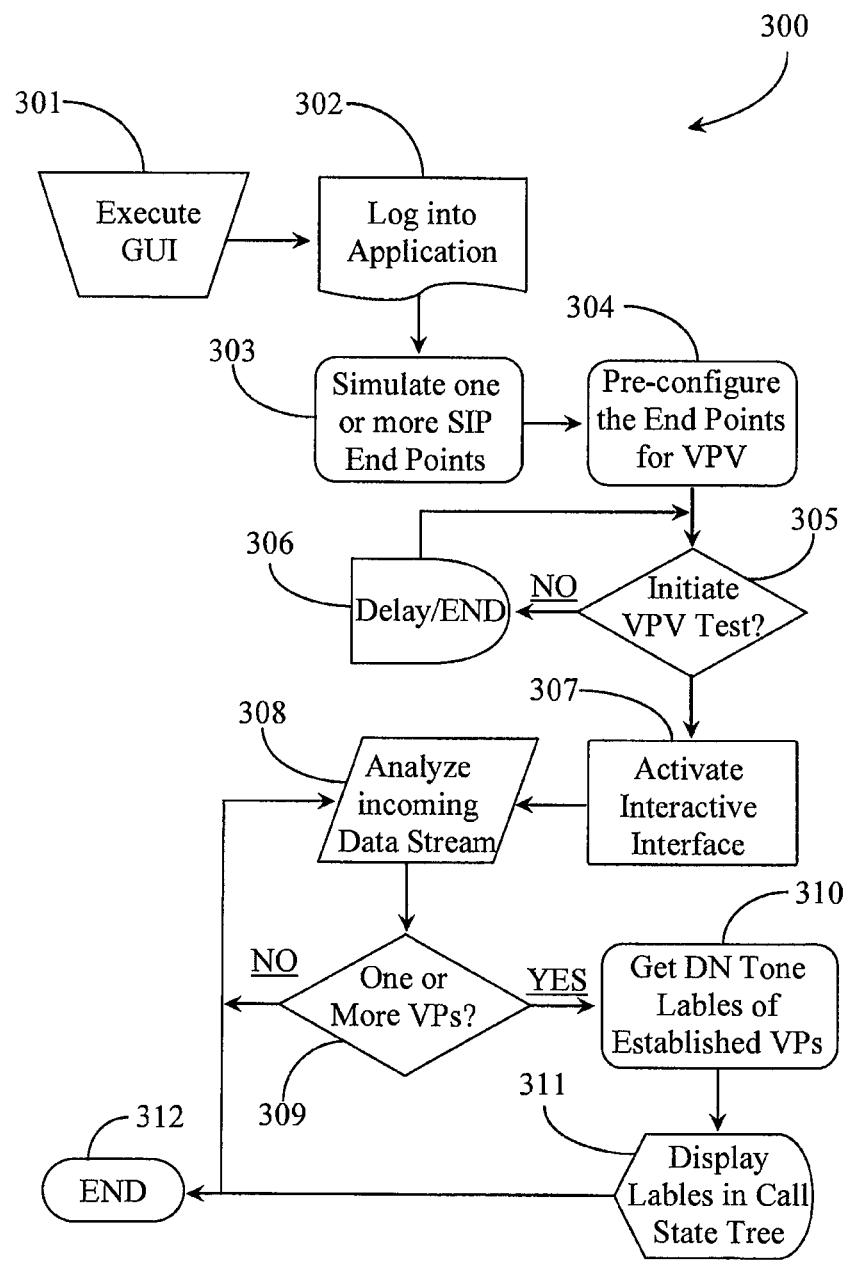
FIG. 3 is a process flow chart depicting acts for verifying voice paths in a telephony environment.

FIG. 3 is a process flow chart 300 depicting acts for verifying voice paths in a telephony environment. In act 301, a user may execute or otherwise access a GUI analogous to GUI 200 of FIG. 2. The GUI may be hosted on a LAN-connected server and may be served to the user upon request and may be displayed on a monitor or display screen of the user's connected computing appliance. In act 302, the user may be required to log into the application with authentication information such as username and password, personal identification number (PIN), or the like in order to use the application to any benefit of the user.

In act 303, the user working through the GUI may simulate one or more SIP endpoints. The SIP endpoints may be simulated with an endpoint simulation engine analogous to engine 204 of FIG. 2. In act 304, the user may pre-configure one or more SIP endpoints for voice path verification (VPV) testing. In act 305, the user may decide whether or not to initiate voice path verification testing of the pre-configured SIP endpoints.

If the user decides not to initiate VPV testing in act 305, the process may end or be delayed in act 306. In the event of delay, the process may loop back to act 305. If the user decides to initiate a VPV test, the process may move to act 307. In act 307, the user may activate an interactive user control panel analogous to user control panel 205 to initiate manual or automated testing. In the case of automated testing, a testing period for test execution may be defined and scheduled. In act 308, the system may analyze the incoming SIP data stream for voice. Based on the results of the analysis, the system may determine, at act 309, whether or not there are established voice paths in the data stream analyzed in act 308.

If the system does not detect any established voice paths in act 309, the process may resolve back to act 308 for continued analysis. If the system detects one or more established voice paths at in act 309, then the SW may retrieve the one or more directory number tone labels pre-configured to the SIP endpoints in act 304. The system may display the retrieved tone labels in one or more views of a call state tree in act 311. The tone labels may be associated as graphic icons with the appropriate graphical representations of the directory numbers in the call state tree. The process may end in act 312 after testing or monitoring results are displayed. In one implementation, the process loops back to act 308, which may be ongoing as long as testing and or call state monitoring is occurring.

Figure 4:
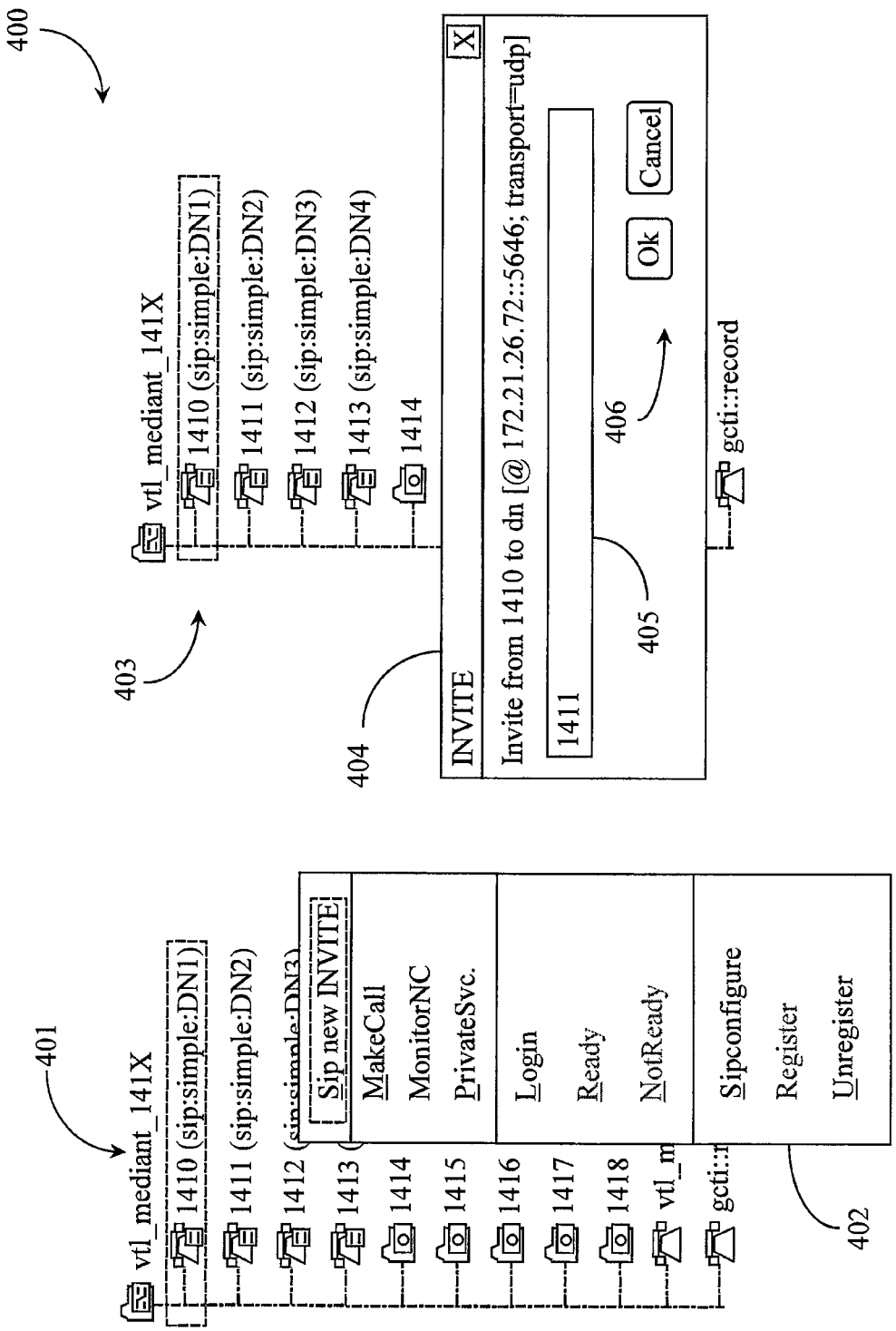
FIG. 4 is a frontal view of a call state chart depicting a session initiation protocol (SIP) voice communication invitation.

FIG. 4 is an illustration of an interactive call state chart 400 depicting a session initiation protocol (SIP) voice communication invitation. Call state chart 400 depicts a call state tree 401. Call state tree 401 may be analogous in structure to the device view of the call state depicted in FIG. 2. State tree 401 shows a "site" folder (vtl_mediant_141 X) expanded out to reveal the call destinations 1410 through 1418. Of these simulated communication endpoints, 1410 through 1413 are pre-configured SIP endpoint destinations. Endpoints 1414 through 1418 may be depicted as CTI (T-server) directory numbers and, although illustrated in the same tree, may not be party to SIP-specific testing routines in this implementation. Endpoint destinations 1410 through 1413 may be configured for SIP voice path verification in this implementation.

State tree 401 may be manipulated in manual testing mode in order to test certain call functions and processes in addition to voice path verification. Testing overall telephony function such as conferencing, for example, for a grouping of SIP endpoints may involve several individual actions. Initiating communication in SIP typically begins with a SIP invite. In this implementation, a user working through the GUI may emulate SIP endpoint 1410 sending a SIP invite to voice communication to DN 1411. A user may simulate this by selecting SIP DN1 (1410) from tree 401 and right clicking on the selection to access menu options associated with call controls. A popup command menu 402 may be displayed so the user can select which function to initiate. In this implementation, the user emulates a calling party at DN1 sending a SIP invite. A user may select SIP new invite (topmost option) to begin the request. Invocation of the option may cause a new dialog window 404 to appear that may be dedicated to finishing out and confirming the parameters of the SIP invite.

Window 404 is an invite dialog window in this implementation and may include a text input box 405 for entering the identifying number of the intended recipient of the invite. In this implementation the target of the invitation to communicate may be SIP endpoint 411. State tree 403 may be a duplication of tree 401 that may represent an updated view or "preview" of the resulting effects of testing on the telephony grouping of endpoint directory numbers. It is noted herein that a telephone icon may represent each SIP DN in tree 401. A user may select SIP new INVITE from options pane 402. Window 404 may appear as a result of the selection to enable the user to type the target number (1411). The system may retrieve the parameters including the URI (172.21.26.72), specified SIP Port (5646), and transport protocol used (unified data protocol (UDP)). The user may execute the act by selecting OK from options 406, which may include a cancel option.

Figure 5:
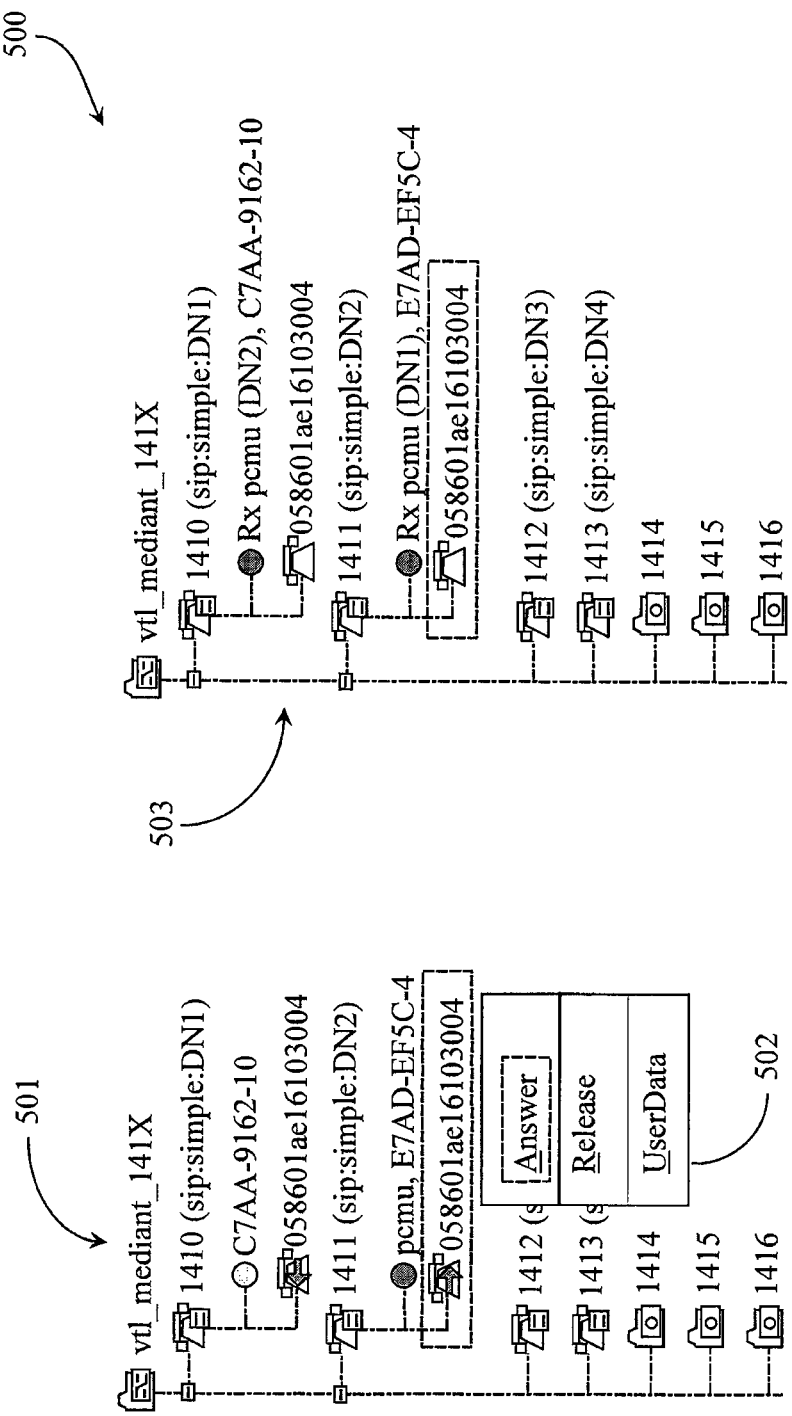
FIG. 5 is a frontal view of a call state chart depicting a SIP target answering the invitation of FIG. 4 establishing a voice session with voice path verification.

FIG. 5 is an illustration of an interactive call state chart 500 depicting a SIP target answering the invitation of FIG. 4, establishing a voice session with voice path verification.

Chart 500 depicts a call state tree 501. Call state tree 501 may be analogous in structure to the device view of the call state depicted in FIG. 2. Tree 501 depicts DN 1410 expanded to show the invitation state and action of the inviting party. The invitation state may be illustrated by a green icon and device ID (C7AA-9162-10) and a telephone icon with Call line ID (058601ae16103004) showing a blue arrow indicating the invitation is in a state of progress of SIP call leg setup.

Call state tree 501 may also depict DN 1411 in expanded view. DN 1411, the intended target of the invitation sent by 1410 in FIG. 4 may be depicted in expanded view to show the process of answering or accepting the invitation. A red icon may indicate that 1411 is in the process of answering the invitation, which may be configured as a ringing event. The blue arrow may indicate that the invite was accepted. The protocol used may be pulse code modulation u-law (PCMU) codec. The endpoint device ID may be E7AD-EF5C-4. A user may select an option to answer in option pane 502 to emulate acceptance of the invitation from DN 1410. It is noted herein that any icon and color scheme might be used to aid visual presentation without departing from the spirit and scope of the present invention.

Call state tree 503 may be a duplicate of tree 501 depicting the results of the call invitation followed by the acceptance of the invitation. In state tree 503, DN 1 (1410) and DN2 (1411) may be depicted as expanded to show graphical icons relative to an established SIP call in progress. For example, DN1 may have a blue connection icon indicative of receiving (Rx) voice from DN2 (1411). DN2 (1411) receives voice from DN1 (1410). The SIP call is currently connected or established as indicated by the blue connection icons associated with each endpoint. Voice path verification may be established in this implementation via PCMU codec. The call line ID is 058601ae16103004. State tree 501 may show the answering process before the SIP call is established and state tree 503 may show the SIP call in full progress after it was established.

Figure 6:
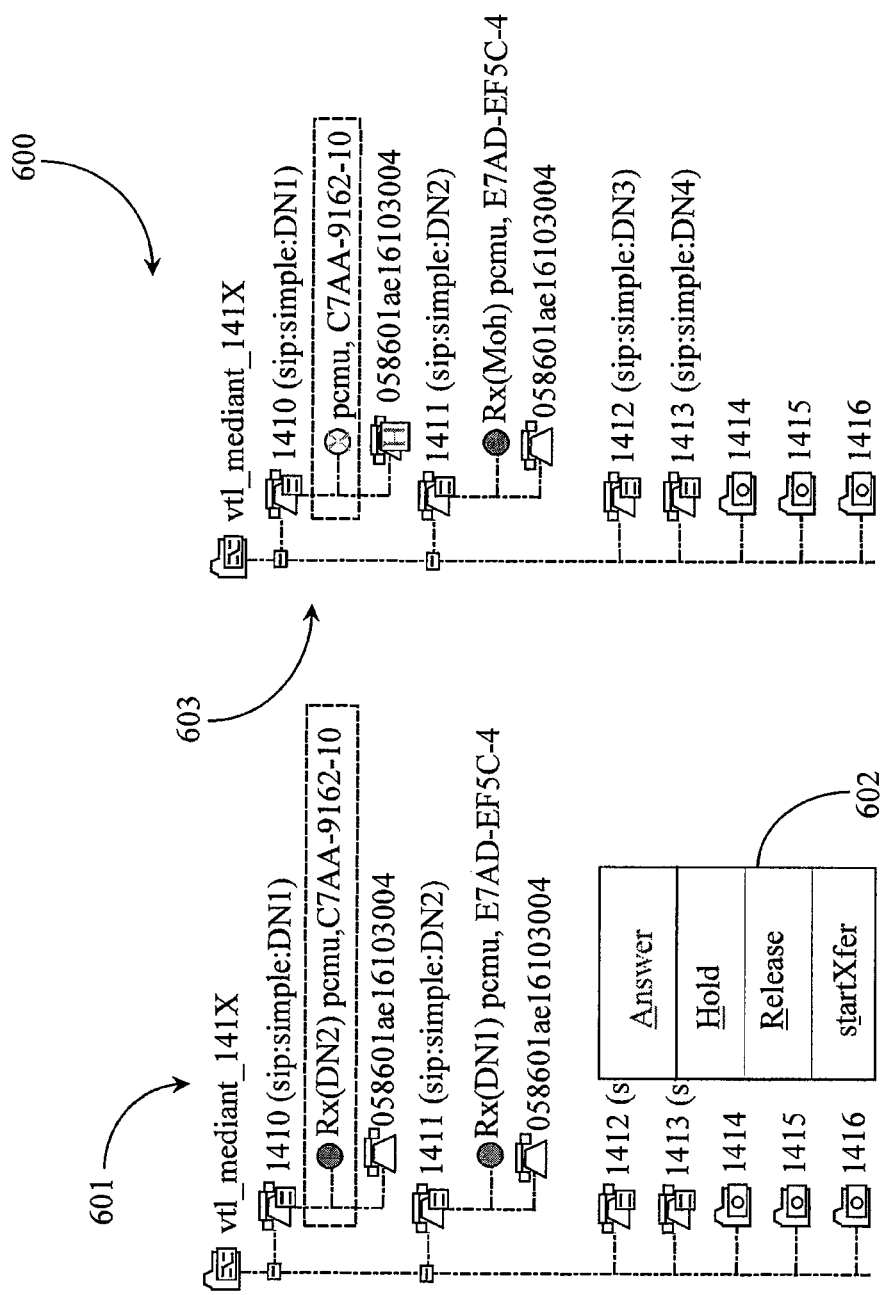
FIG. 6 is a frontal view of a call state chart depicting a first party hold placed on the established SIP call of FIG. 5.

FIG. 6 is an illustration of an interactive call state chart 600 depicting a first party hold placed on the established SIP call of FIG. 5. Chart 600 depicts a call state tree 601. Call state tree 601 may be analogous in structure to the device view of the call state depicted in FIG. 2. State tree 601 may depict both DN1(1410) and DN2 (1411) in expanded view to show active SIP call in progress as depicted in state tree 503 of FIG. 5. The blue connection icons may indicate full SIP communication between the endpoints. A user may emulate a first party call hold initiated by DN1 by selecting DN1 and right clicking the selection to display a popup command menu 602. The user may then select an option to hold to place DN1 on hold.

State tree 603 may be a duplicate of state tree 601 and depicts the results of the hold initiation. DN1(1410) may be on hold in state tree 603 as evidenced, in this implementation, by the connection icon depicting a green X and a telephone icon with the letter H indicating that DN1 is currently on hold. DN1(1410) is not receiving anything from DN2 (1411). DN2 (1411) may receive music on hold (Moh). Voice path may be enabled via PCMU codec.

Figure 7:
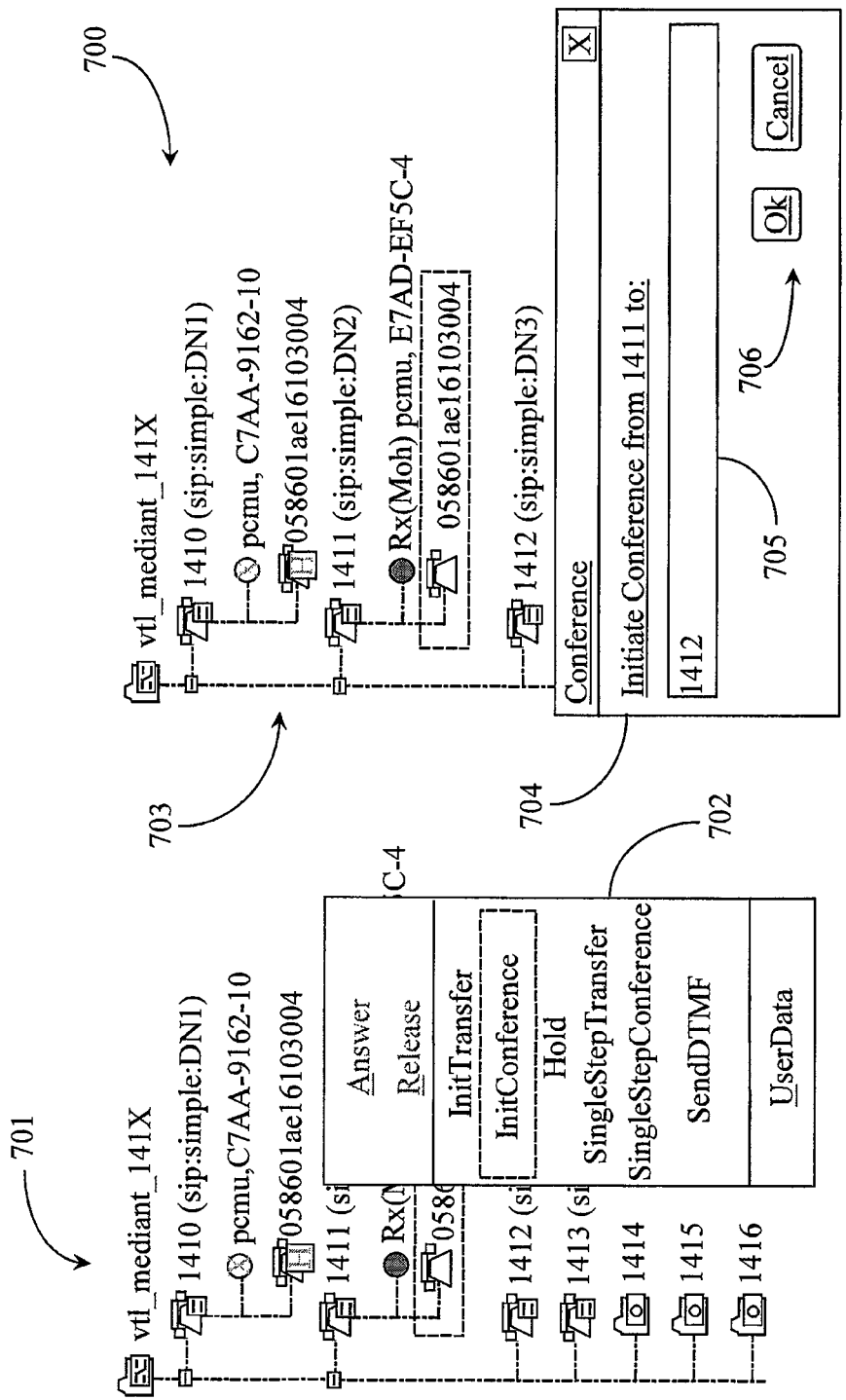
FIG. 7 is a frontal view a call state chart depicting the initiation of a conference call invitation to a third SIP client.

FIG. 7 is an illustration of an interactive call state chart 700 depicting the initiation of a conference call invitation to a third SIP client. Chart 700 depicts a call state tree 701. State tree 701 may be analogous to state tree 603 of FIG. 6. Call state tree 701 may be analogous in structure to the device view of the call state depicted in FIG. 2. State tree 701 may depict both DN1(1410) and DN2 (1411) in expanded view to show one SIP party on hold, and the other SIP party receiving music on hold (Moh).

A user may select DN 1411 and right click the selection to display a popup command menu 702. The user may then select the option among others for initiating a conference call (InitConference). State tree 703 may be a duplicate of state tree 701 and may not contain any additional information. User selection of the conference initiation option may cause display of a dialog window 704. Window 704, which may be titled Conference, may have an input field 705. A user may type in the SIP target of the conference call initiation as 1412, which is DN3 in this implementation. The user may then click the OK option in submission options 706, which may include a cancel option.

Figure 8:
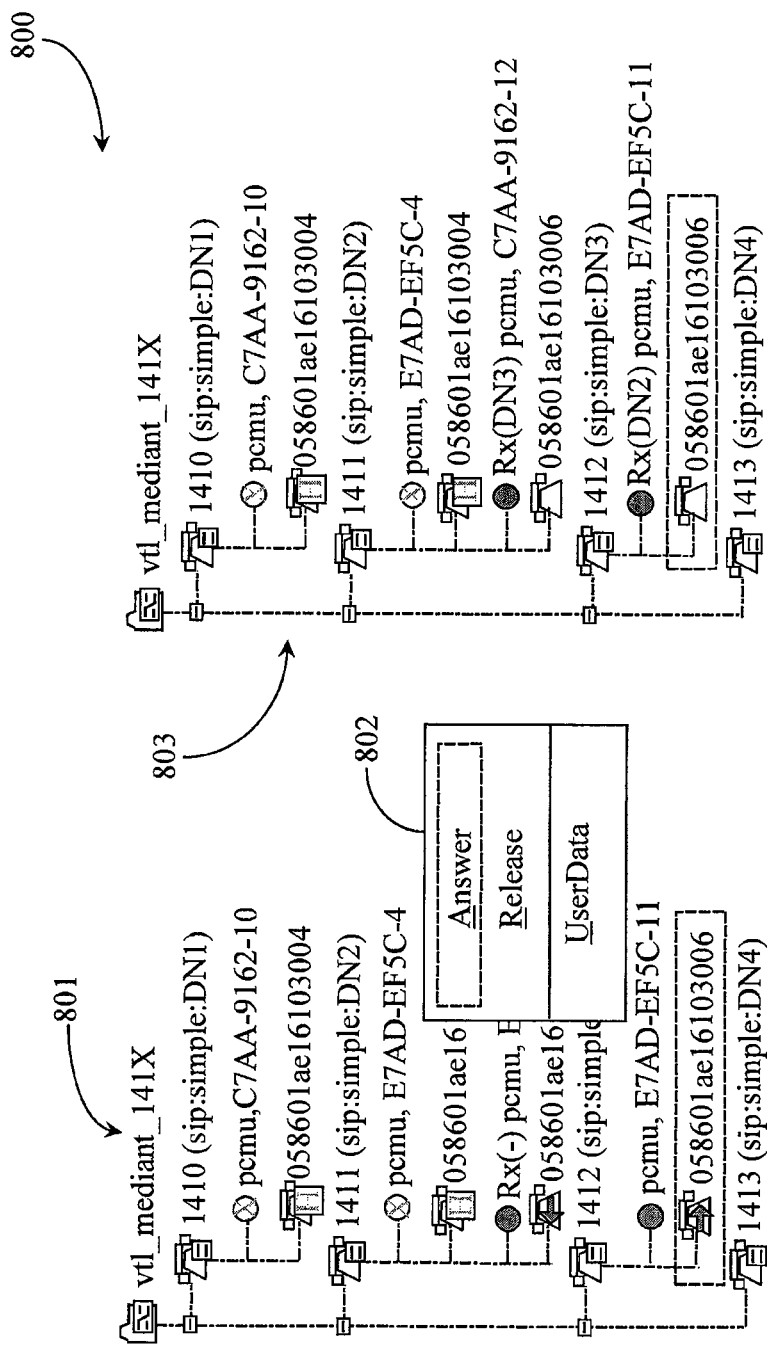
FIG. 8 is a frontal view of a call state chart depicting the SIP target of FIG. 7 answering the invitation to conference with voice path verification.

FIG. 8 is an illustration of an interactive call state chart 800 depicting the SIP target of FIG. 7 answering the invitation to conference with voice path verification. Call state chart 800 depicts a call state tree 801. Call state tree 801 may be analogous in structure to the device view of the call state depicted in FIG. 2. Call state tree 801 may depict the SIP target (DN3; 1412) answering the conference invitation from DN2 (1411). A user may emulate the answer process in testing by selecting DN2 and right clicking on the selection to bring up a popup command menu 802 and then selecting answer.

In state tree 801, DN1(1410) and DN2 (1411) are both on hold with respect to call line 1 (058601ae16103004) in this implementation. The conference initiation from DN2 (1411) to DN3 (1412) may use a second call line or call line 2 (058601ae16103006). DN2 (1411) may be expanded in state tree 801 to illustrate the conference invitation in progress with Rx (Blue connection icon) waiting and a blue arrow over the telephone icon showing the invitation in progress. DN 3 (1412) may be depicted as answering or accepting the conference invitation from DN2 (1411) as evidenced by a red connection icon and a red arrow over the telephone icon. The device ID for DN3 (1412) is E7AD-EF5C-11 in this implementation. Call state tree 803 may depict all three DNs in expanded view as illustrated.

DN 1 (1410) is on hold with respect to line 1 (058601ae16103004) and has no Rx. DN2 (1411) is also on hold with respect to line 1 and has no Rx. DN2 (1411) has Rx from DN3 (1412) on line 2 (058601ae16103006) as evidenced by the blue connection icon. DN3 (1412) has Rx from DN2 (1411) on line 2 (058601ae16103006) as evidenced by the blue connection icon. The conference call is in progress between DN2 (1411) and DN3 (1412) over line 2 with voice path established via PCMU codec.

Figure 9:
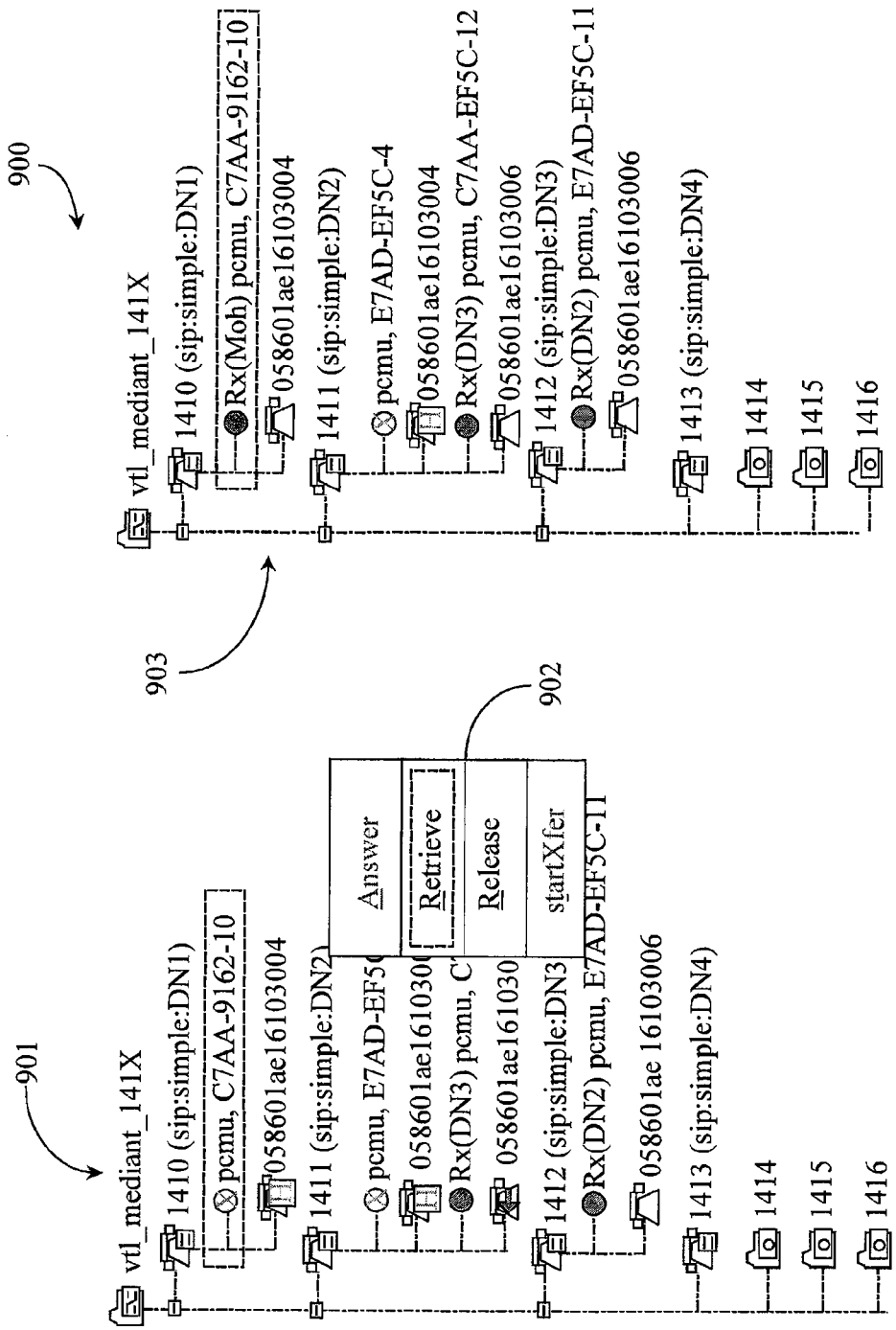
FIG. 9 is a frontal view of a call state chart depicting the initiating party of the conference retrieving the on-hold call.

FIG. 9 is an illustration of an interactive call state chart 900 depicting the initiating party of the conference retrieving the on-hold call over line 1 (058601ae16103004). Call state chart 900 depicts a call state tree 901. Call state tree 901 may be analogous in structure to the device view of the call state depicted in FIG. 2. Call state tree 901 may depict DN1(1410) in expanded view and still on hold relative to line 1 (058601ae16103004). Call state tree 901 may depict DN2 (1411) still on hold relative to line 1 (058601ae16103004). DN2 (1411) and DN3 (1412) are connected with voice path verification on line 2 (058601ae16103006) in this implementation.

A user may emulate call retrieval by DN1(1410) relative to call line 1 (058601ae16103004) by selecting the connection icon and right clicking on the icon to bring up popup command menu 902 and then selecting a command to retrieve. Call state tree 903 may be a duplicate of state tree 901 showing the results of invoking the command to retrieve. Call state tree 903 may depict DN1(1410) having no voice Rx but receiving music on hold (Moh) on call line 1 (058601ae16103004). DN2 (1411) may be depicted in expanded view showing that it is still on hold with respect to call line 1 (058601ae16103004) with no Rx on that line. DN2 (1411) has Rx from DN3 (1412) over call line 2 (058601ae16103006) in this implementation. DN3 (1412) has Rx from DN2 (1411) over call line 2 (058601ae16103006), in this implementation, with voice path established via PCMU codec.

Figure 10:
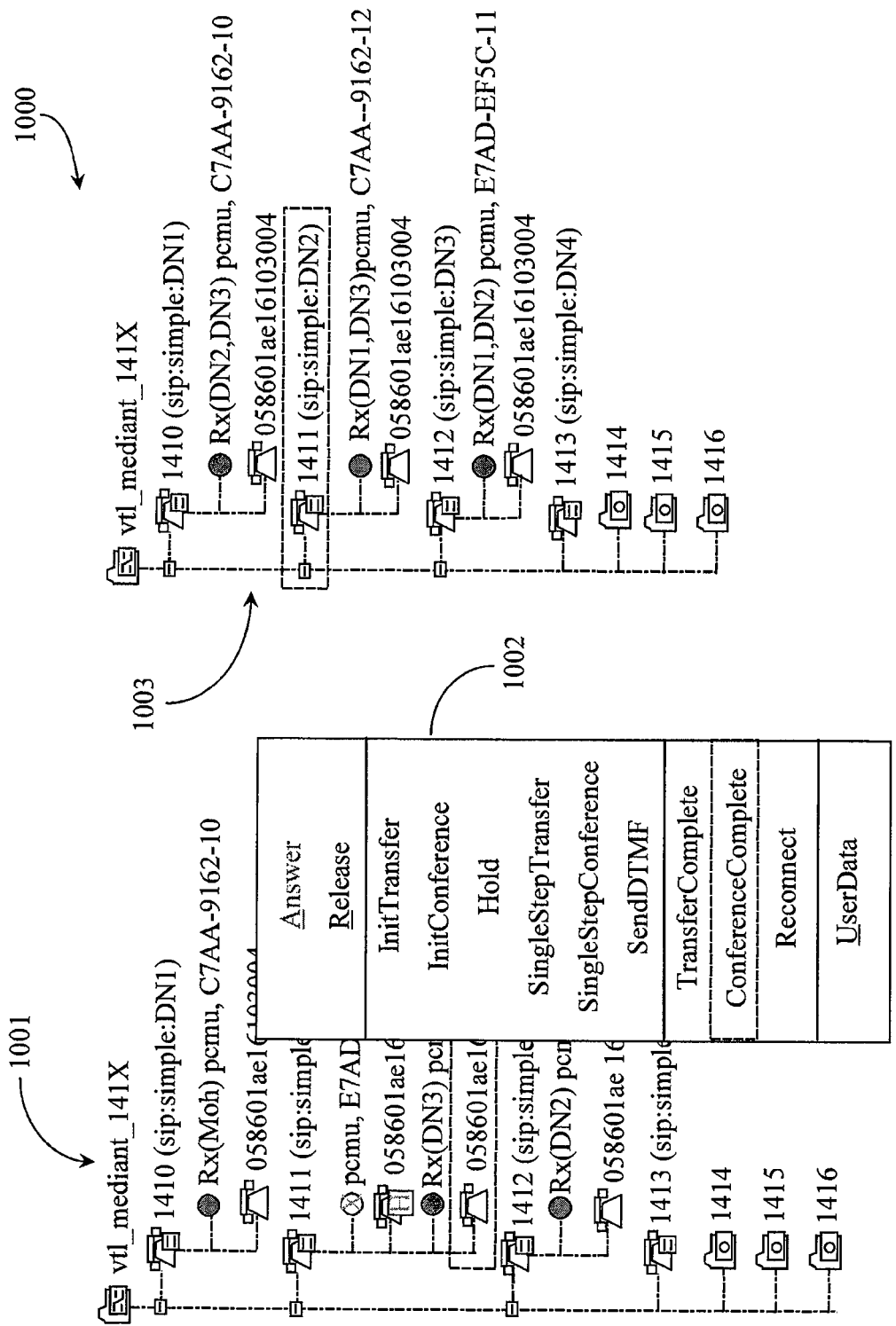
FIG. 10 is a frontal view of a call state chart depicting a three-party conference voice call completed with voice path verification.

FIG. 10 is an illustration of an interactive call state chart 1000 depicting a three-party conference voice call completed with voice path verification. Call state chart 1000 depicts a call state tree 1001. Call state tree 1001 may be analogous in structure to the device view of the call state depicted in FIG. 2. Call state tree 1001 may depict DN1 (1410) connected on line 1 (058601ae16103004) and receiving music on hold (Moh). State tree 1001 may depict DN2 (1411) on hold relative to line 1 (058601ae16103004) having no Rx. DN2 (1411) may be depicted as connected relative to line 2 (058601ae16103006) and receiving voice from DN3 (1412). State tree 1001 may depict DN3 (1412) connected over line 2 (058601ae16103006) and receiving voice from DN2 (1412).

In this implementation, a user may select DN2 (1411), line 2 (058601ae16103006) and right click to bring up a popup command menu 1002. The user may then select the command conference complete to emulate establishment of a three-way conference call on line 1 (058601ae16103004). In this implementation, DN1 is already on line 1 with the conference bridge listening to music on hold. DN 2 and DN3 may be connected over line 1 and dropped from line 2. Call state tree 1003 may be a duplicate of state tree 1001 showing the results of invoking the command Conference Complete.

Call state tree 1003 may depict DN1(1410) receiving voice from DN2 (1411) and from DN3 (1412) over line 1 (058601ae16103004); DN2 (1411) receiving voice from DN1(1410) and from DN3 (1412) over line 1 (058601ae16103004); and DN3 (1412) receiving voice from DN1(1410) and from DN 2 (1411) over line 1 (058601ae16103004). A full conference call may be simulated with voice paths enabled via PCMU codec.

Figure 11:
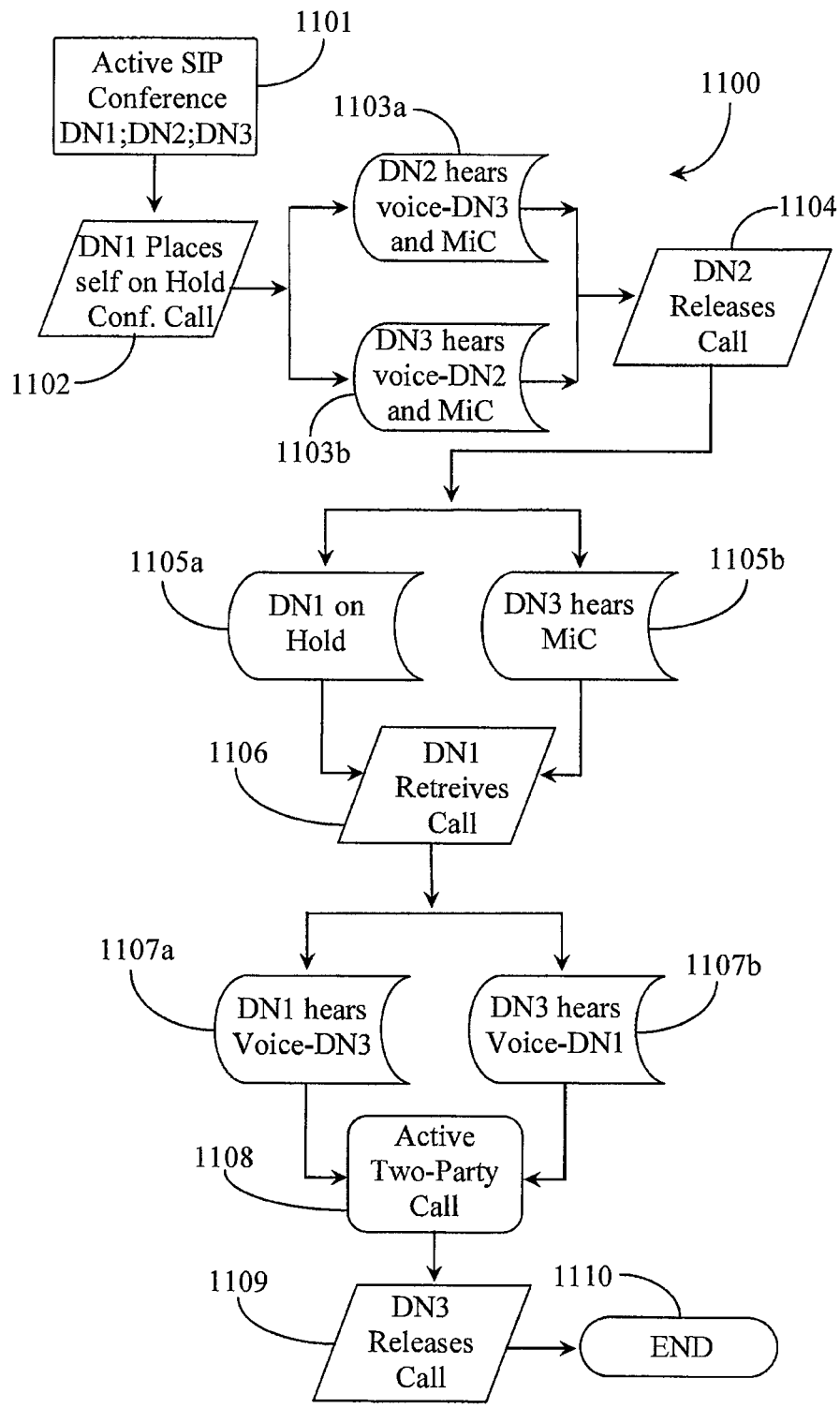
FIG. 11 is a process flow diagram 1100 depicting acts for emulating termination of the three-party conference call of FIG. 10 according to an implementation of the present invention.

FIG. 11 is a process flow diagram 1100 depicting acts for emulating termination of the three-party conference call of FIG. 10 according to an implementation of the present invention. In act 1101, a simulated SIP conference between three parties (DN1; DN2; DN3) is observed and may be represented via a call state tree similar or identical to call state tree 1003 of FIG. 10. A user emulating termination of the conference call may simulate placement of DN1 on hold. This action may result in DN2 hearing the voice of DN3 and music in conference (MiC) replacing the voice of DN1 in act 1103*a*. Concurrently, DN3 may hear the voice from DN2 and MiC in place of voice from DN1.

In act 1104, the user may emulate the release of the conference call by DN2. This action may leave DN1 on hold in act 1105*a* and DN3 receiving MiC concurrently in act 1105*b*. In act 1106, the user may emulate call retrieval by DN1. This action may cause DN1 to receive voice from DN3 in act 1107*a*, and concurrently, DN3 receiving voice from DN1 in act 1107*b*. This action may result in display in the call state tree of a full two party call between DN1 and DN3 in act 1108 with voice path verification. The user may emulate call release by DN3 in act 1109. This action results in call leg tear down and process end at act 1110.

FIGS. 4 through 11 may represent just one implementation of SIP telephony functional testing of telephony connections, commands, and voice path validation orchestrated though a single user interface supporting simulation of both CTI and SIP endpoints and a call flow that integrates first party (SIP) and third party (T-Lib) call controls through a single user interface. Other tests to validate other call functions and call scenarios might be conducted using the GUI of FIG. 2 in accordance with other implementations of the present invention.

It will be apparent to one with skill in the art of telephony that CTI and SIP calls may be represented in a same call state tree and may be tested for connection and command functionality through the same interface without departing from the spirit and scope of the present invention. It may also be apparent that the GUI may also be leveraged for monitoring the functionality of live telephony scenarios occurring concurrently in both SIP and CTI communication. It may be also apparent that combining all relevant client-side information in one place, both in form of graphical state representation and historical logs, significantly simplifies the troubleshooting process.

It will be apparent to one with skill in the art that the telephony endpoint simulation, testing, and monitoring system of the invention may be provided using some or all of the mentioned features and components without departing from the spirit and scope of the present invention. It will also be apparent to the skilled artisan that the implementations described above are specific examples of a single broader invention, which may have greater scope than any of the singular descriptions taught. There may be many alterations made in the descriptions without departing from the spirit and scope of the present invention.

What is claimed is:

1. An apparatus comprising:
    a processor; and
    a memory, the memory storing instructions that, when executed by the processor, cause the processor to:
        access a pre-designed graphical user interface (GUI) framework;
        load into the GUI, simulation of first and second endpoints, wherein the first and second endpoints are configured for voice-over-IP communication;
        load into the GUI, representations of telephony objects;
        load into the GUI, an interactive user control panel;
        display the GUI on a computing appliance monitor;
        receive, via the GUI, user actuation of a first command to initiate a simulation of a voice-over-IP call from the first endpoint to the second endpoint;
        transmit, in response to the first command, an invitation by the first endpoint to the second endpoint;
        display, via the GUI, in response to the transmitting, a state of the invitation with respect to both the first endpoint and the second endpoint;
        receive, via the GUI, user actuation of a second command to accept the voice-over-IP call from the first endpoint;
        simulate, via the GUI used to initiate the simulation of a voice-over-IP call from the first endpoint to the second endpoint, in response to receipt of the second command, acceptance of the voice-over-IP call by the second endpoint;
        display, via the GUI, in response to the simulated acceptance, a state of the voice-over-IP call with respect to both the first endpoint and the second endpoint.

2. The apparatus of claim 1 implemented in a contact center environment.

3. The apparatus of claim 1 wherein the first and second endpoints are session initiation protocol (SIP) endpoints and the voice-over-IP communication is a SIP communication.

4. The apparatus of claim 1 wherein the telephony objects include one or more of a switch, a router, a hub, a gateway, a server, an auto-attendant, or a communication end-point.

5. The apparatus of claim 1 wherein the display of the state of the invitation is a telephony-state tree having two separate active state views.

6. The apparatus of claim 5 wherein one active state view depicts a device view of active calls where calling parties are identifiable as sub-elements to directory numbers (DNs).

7. The apparatus of claim 5 wherein one active state view depicts a call view of active calls where calling parties are depicted as sub-elements of calls and call threads.

8. The apparatus of claim 1 wherein the telephony object representations are interactive icons.

9. The apparatus of claim 1 wherein the interactive user control panel includes testing controls for manual and for automated testing of active telephony state.

10. The apparatus of claim 9 wherein the interactive user control panel further includes tools for reconfiguring telephony objects.

11. The apparatus of claim 10 wherein the interactive user control panel includes first party call controls.

12. A method comprising:
   accessing a pre-designed graphical user interface (GUI) framework;
   loading, by a processor, into the GUI, simulation of first and second endpoints, wherein the first and second endpoints are configured for voice-over-IP communication;
   loading, by the processor, into the GUI, representations of telephony objects;
   loading, by the processor, into the GUI, an interactive user control panel;
   displaying, by the processor, the GUI on a computing appliance monitor;
   receiving, via the GUI, user actuation of a first command to initiate a simulation of a voice-over-IP call from the first endpoint to the second endpoint;
   transmitting, in response to the first command, an invitation by the first endpoint to the second endpoint;
   displaying, via the GUI, in response to the transmitting, a state of the invitation with respect to both the first endpoint and the second endpoint;
   receiving, via the GUI, user actuation of a second command to accept the voice-over-IP call from the first endpoint;
   simulating, via the GUI used to initiate the simulation of a voice-over-IP call from the first endpoint to the second endpoint, in response to receipt of the second command, acceptance of the voice-over-IP call by the second endpoint;
   displaying, via the GUI, in response to the simulated acceptance, a state of the voice-over-IP call with respect to both the first endpoint and the second endpoint.

13. The method of claim 12 further comprising:
configuring one or more simulated directory numbers associated with the first and second endpoints, with an audible tone and unique name.

14. The method of claim 13 further comprising:
analyzing incoming telephony stream for established voice paths between the first and second endpoints.

15. The method of claim 14 further comprising:
receiving, by a digital tone detector, the audible tones and associated names assigned to the configured directory numbers that are currently party to voice.

16. The method of claim 15 further comprising:
displaying the names associated with those directory numbers in a visual manner.

* * * * *